United States Patent [19]
Hobbs

[11] 3,829,152
[45] Aug. 13, 1974

[54] VEHICLE WINDSHIELD ASSEMBLY
[75] Inventor: L. T. Hobbs, Raleigh, N.C.
[73] Assignee: U.S. Supply Company, Raleigh, N.C.
[22] Filed: Mar. 8, 1973
[21] Appl. No.: 339,085

[52] U.S. Cl. .................................. 296/78, 296/78.1
[51] Int. Cl. .......................... B60j 1/02, B62j 17/00
[58] Field of Search ............ 296/78.1, 78, 78 A, 79, 296/83, 82

[56] References Cited
UNITED STATES PATENTS

| | | | |
|---|---|---|---|
| 965,233 | 7/1910 | Scott | 296/83 |
| 1,877,609 | 9/1932 | Stern et al. | 296/78.1 X |
| 2,789,863 | 4/1957 | Shimabukuro | 296/78 A |
| 3,284,130 | 11/1966 | Michael | 296/78.1 |
| 3,709,553 | 1/1973 | Churchill | 296/78 R X |

*Primary Examiner*—David Schonberg
*Assistant Examiner*—John A. Pekar
*Attorney, Agent, or Firm*—Mills and Coats

[57] ABSTRACT

In abstract, a preferred embodiment of the present invention is a windshield assembly for a vehicle which extends generally between the vehicle top and the lower frame structure thereof in the front portion of such vehicle. The windshield assembly comprises an upper and lower windshield secured together along an inner side of each by a transverse seam structure. A series of snap-on securing means are disposed along the upper edge of the upper windshield and are adapted to fasten to receiving means secured to the top of said vehicle. For securing the lower portion of the windshield assembly, the present invention provides a series of laterally spaced straps threaded through the lower portion of the lower windshield and adapted to tie around a lower windshield attaching means projecting forwardly from the body of the vehicle.

5 Claims, 5 Drawing Figures

PATENTED AUG 13 1974 3,829,152
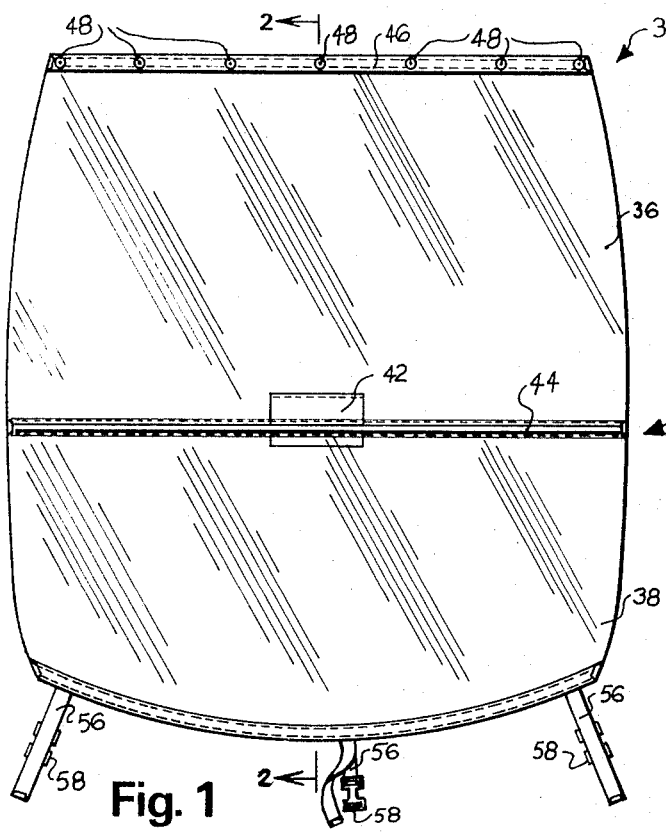
Fig. 1
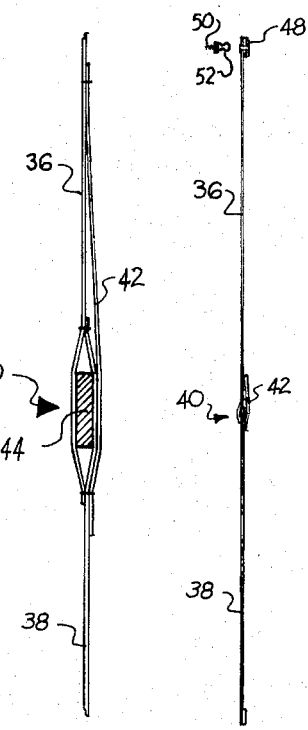
Fig. 2a  Fig. 2
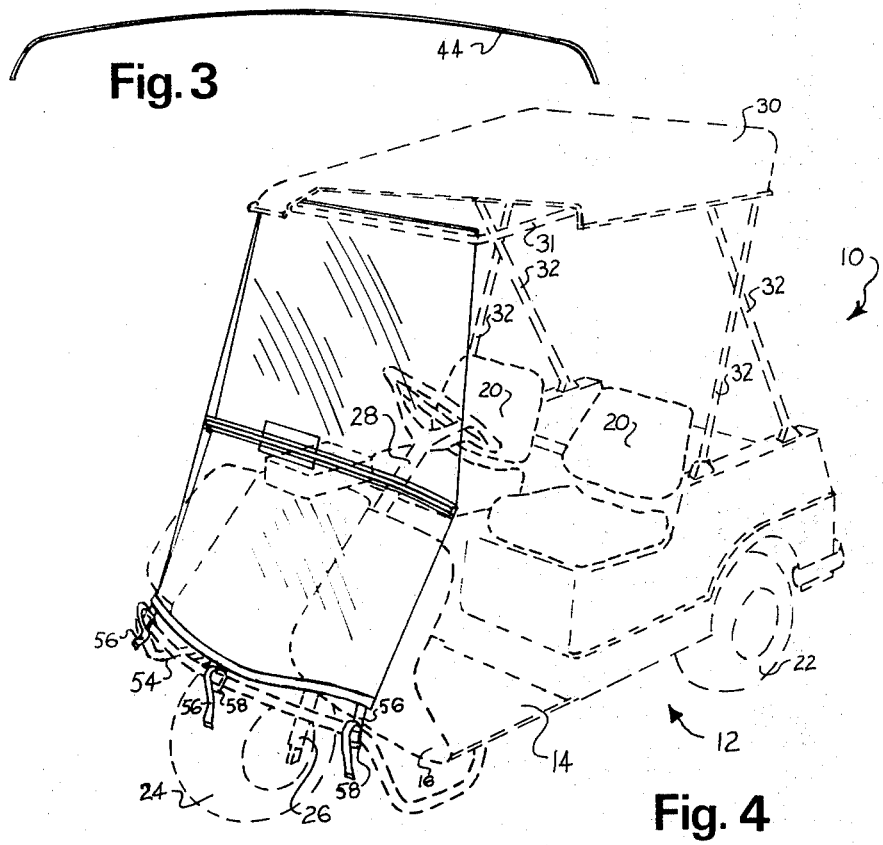
Fig. 3
Fig. 4

VEHICLE WINDSHIELD ASSEMBLY

The present invention relates to vehicles, and more particularly to removable windshield assemblies for recreation type vehicles.

Golf carts, particularly the three-wheel battery powered type, are well known and have long been used by golfers as a means of transportation over the golf course being played. One type of golf cart that is especially popular among golfers is the "convertible" which includes a top or canopy adapted to be removed from the vehicle or simply moved down to a position adjacent the vehicle. Such a convertible type vehicle enables the golfers to ride in an open vehicle when desirable and weather permits, but with the top up the convertible vehicle provides a shelter in case of rain or extreme heat.

To assure an adequate sheltering effect, a windshield for such vehicles is also needed, and preferably the windshield should be removable to make the vehicle as open as possible. Providing a simple, relative inexpensive windshield for a convertible type golf cart, however, becomes quite difficult. This difficulty is compounded when one attempts to design a removable windshield or windshield assembly.

More particularly, each cart, even from the same manufacturer, will vary in distance from the roof to the vehicle body. On occasion, this distance (which is covered by the windshield of the present invention) will vary from time to time during operation of the vehicle. Fixed securing means have been tried but either the windshield will hang loose or, if it is taunt at the beginning, it will be pulled too tight with resulting damage when the vehicle is operated.

After much research and study into the above problems, the present invention has been devised and provides a removable windshield assembly for a convertible golf cart type vehicle. The windshield assembly of the present invention comprises an upper and lower windshield secured together by a transverse seam structure extending along the inner edges of each windshield. In addition, the windshield assembly is provided with snap on fastening means about the upper edge for securing the entire windshield assembly to the front portion of the vehicle top or canopy. About the lower edge of the windshield assembly is provided a series of straps with buckle type fasteners associated with each. The straps are threaded through the lower edge of the windshield assembly and are adapted to tie around a windshield attaching means disposed along the front portion of the vehicle body structure. By using the flexible straps to generally retain the lower portion of the windshield assembly, it will be appreciated that the windshield attaching means carried by the vehicle body structure may move independently of the windshield assembly, as the vehicle traverses various depressions and undulations in the ground, without interfering with or damaging the windshield assembly.

It is, therefore, an object of the present invention to provide a simple, relatively inexpensive, removable windshield assembly for a vehicle.

A further object of the present invention resides in the provision of a removable windshield assembly for a convertible type golf cart having a canopy or top that may be readily removed therefrom or moved to a down position, thereby providing a substantially open top vehicle.

An additional object of the present invention is to provide a simple, easy to construct windshield assembly that is adapted to extend between the top of a vehicle and the lower body or chassis structure, with the windshield being so disposed that the lower body or chassis structure may move independently thereof without interfering or damaging the windshield assembly.

A further object of the present invention is to provide a vehicle with a windshield assembly comprised of an upper and lower windshield secured together by a transverse seam structure.

A further object of the present invention resides in the provision of a windshield assembly having an upper and lower windshield secured together by a transverse seam structure wherein said transverse seam structure includes a reinforcing strip extending longitudinally therethrough.

Other objects and advantages of the present invention will become apparent and obvious from a study of the following description and the accompanying drawings which are merely illustrative of the present invention.

IN THE DRAWINGS

FIG. 1 is a front elevational view of the windshield assembly of the present invention;

FIG. 2 is a side elevational view of the windshield assembly shown in FIG. 1;

FIG. 2a is an enlarged sectional view of the windshield assembly seam structure shown in FIG. 2;

FIG. 3 is a top plan view of the same windshield assembly shown in FIGS. 1 and 2; and FIG. 4 is a perspective view of a golf cart, as viewed from the front and to one side, showing the windshield assembly of the present invention incorporated therein and extending generally from the front portion of the top of the vehicle down to a windshield attaching bar extending across a lower front portion of the vehicle body structure.

With further reference to the drawings, particularly FIG. 4, a golf cart is shown therein and indicated generally at 10. Golf cart 10 comprises a chassis or lower body structure indicated generally at 12, having a floorboard 14, a head panel 16 extending upwardly and slightly rearwardly from the front of the floorboard 14, and a rear body area 18 having a pair of seats 20 disposed thereabove in side-by-side relationship.

Rotatively mounted to the rear portion of the chassis or body structure 12 is a pair of rear wheels 22 (only one of which is shown). For supporting the front of the golf cart vehicle 10, there is provided a front wheel 24 rotatively mounted within front wheel yoke 26, said front wheel yoke being rotatively journaled about an axis extending behind the head panel 16 and operatively connected to an aligned steering wheel 28, whereby the front wheel yoke 26 and front wheel 24 may be steered thereby.

The golf cart vehicle 10 is further provided with a convertible top or canopy 30, as best seen in FIG. 4, which may be constructed of fiberglas or other suitable material. Top 30 is generally supported by a rectangular frame 31 and extends generally horizontally over the seats 20 and floorboard area 14.

As pointed out above, the top 30 is preferably of the convertible type which can be readily removed from the vehicle or moved down to a position closely adjacent the body structure for providing an open top vehicle. In the present disclosure, a pair of cross supports 32 are disposed on each side of the vehicle and generally extend between the rear body area 18 and the rear portion of the top or canopy 30. The cross supports 32 are secured to the rear body area 18 and to the canopy 30 so as to support the top or canopy at a predetermined height above the vehicle. Also, the cross supports 32 are adapted to be readily detachable from either the rear body area 18 or the top 30 in order to remove the top from the golf cart vehicle. Alternatively, the cross supports 32 may be adapted to allow the entire top or canopy 30 to be swung to a down position adjacent the rear end of the golf cart vehicle to provide an open top.

Turning to the windshield assembly, as specifically shown in FIGS. 1–3, it is noted that the windshield assembly is indicated generally at 34 therein. Viewing the windshield assembly 34 in detail, it will be seen that the windshield assembly comprises an upper transparent windshield 36 and a lower transparent windshield 38. These windshields are secured together to form a unitized windshield assembly by a seam structure indicated generally by the numeral 40. The seam structure basically comprises a reinforcing member 42 secured to the rear side of both the lower and upper windshield 36 and 38, respectively, by a stitch connection or other suitable means. As best seen in FIG. 2, the reinforcing member 42 extends across the inner edges of each windshield and, as illustrated in FIG. 1, is centered generally between the sides thereof. In addition, the seam structure 40 includes a reinforcing strip 44 that extends along the seam area 40 and lies inwardly of the reinforcing member 42.

An upper reinforcing strip 46 of any suitable heavy plyable material, such as clear plastic, or the like, is provided along the upper edge of the upper windshield 36, as shown in FIGS. 1 and 2. A series of laterally spaced snap on button means 48 are secured within the upper reinforcing strip 46 and the upper windshield 36 with the open end of each being disposed upon the rear side of the windshield assembly 34. To receive the snap-on button means 48, the present disclosure includes a series of anchor bolts 50 adapted to be screwed into either the under front edge of the top 30 or to support frame 31. The anchor bolts 50 are spaced to correspond with the spacing of the snap-on buttons means 48 and are provided with an integrally formed, outwardly projecting rounded head 52 which is adapted to receive a respective snap-on button means 48. Therefore, it is appreciated that the upper portion of the windshield assembly 34 may be secured to the golf cart vehicle 10 by pressing the snap-on button means 48, extending along the upper edge of the windshield assembly 34, onto the rounded head portions 52 of the anchor bolts 50 which are spacingly disposed along the forward edge of the top or canopy 30.

In order to secure the lower portion of the windshield assembly 34 to the golf cart vehicle 10, there is provided a lower windshield mounting means in the form of an irregular shaped tubular member 54 which extends generally from the lower body or chassis structure 12 across the lower front portion of the vehicle 10, as best seen in FIG. 4. The lower windshield 38 is provided with a series of flexible straps 56 composed preferably of a resilient or elastomer type material. Each strap is threaded or secured to the lower edge of the lower windshield 38 and has a fastening buckle 58 associated therewith. Thus, it can be seen that the lower portion of the windshield assembly 34 may be stablized and retained by the vehicle by wrapping the tie straps 56 around the lower windshield mounting attachment 54 and tying the straps therearound by the use of the buckle 58 associated therewith.

The individual installing the windshield assembly 34 may adjust the tension of each strap 56 during the installation. But irrespective of the tension placed on the straps 56, it is appreciated that as the golf cart vehicle 10 traverses various undulations in the ground that the chassis structure and consequently the lower windshield mounting attachment 54 can move in response thereto relative to the windshield assembly 34 without interfering or damaging the same.

To remove the windshield assembly 34, the straps 56 are unfastened from their associated buckles 58 and removed from the lower windshield mounting attachment 54. Next the snap-on buttons 48 are pulled from the rounded heads 52 projecting from the anchor bolts 50 that are threaded in the forward front edge of the vehicle top or canopy 30.

From the above, it follows that to install the windshield assembly, the top portion is preferably secured to the golf cart vehicle first by securing the snap-on buttons 48 to the rounded heads 52 just described. The final step of installation is the tying of the straps 56 around the lower windshield mounting attachment 54.

From the foregoing, it is apparent that the present invention provides a simple, relatively inexpensive windshield assemlby for a golf cart vehicle. Besides being simple to construct and reliable to use, the windshield assembly of the present invention is particularly designed to be readily removed from the vehicle 10 and is adapted to form an integral construction with a canopy or top which can be of the convertible type. Therefore, the windshield assembly of the present invention provides a convenient and useful attachment for a vehicle of the type described and disclosed herein.

The terms "upper," "lower," "forward," "rearward," etc., have been used herein merely for the convenience of the foregoing specification and in the appended Claims to describe the vehicle windshield assembly and its parts as oriented in the drawings. It is to be understood, however, that these terms are in no way limiting to the invention since the vehicle windshield assembly may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are inteded to be embraced herein.

What is claimed is:

1. A windshield assembly for a land traversing vehicle comprising: a mobile vehicle of the type having a wheel supported body structure and a top generally supported thereabove; lower windshield attaching means extending from the forward portion of said vehicle body structure; and a forwardly disposed windshield assembly generally extending between a front portion of said top and said lower windshield attaching means, said windshield assembly including, an upper and lower windshield, means for connecting said upper windshield to said top of said vehicle, windshield connecting means for securing an upper portion of said lower windshield to a lower portion of said upper windshield, said windshield connecting means including a transverse seam structure having a reinforcing member extending across the seam structure and secured to both said upper and lower windshields, and resilient connecting means associated with said lower windshield and adapted to attach to said lower windshield attaching means whereby said lower windshield attaching means may move relative to said windshield assembly as said vehicle traverses uneven terrain without interfering or damaging said windshield assembly.

2. The windshield assembly of claim 1 wherein said seam structure further includes an elongated reinforcing strip generally extending between said windshield assembly and said reinforcing member.

3. The windshield assembly of claim 2 wherein said connecting means for attaching said windshield assembly to said lower windshield attaching means comprises a plurality of laterally spaced flexible straps, each strap being threaded through a lower portion of said lower windshield and including a fastening buckle on one end thereof with said buckle being operative to receive the opposite end of the respective strap and to secure that end around the lower windshield attaching means.

4. The windshield assembly of claim 3 wherein said means for securing said upper windshield to said top of said vehicle includes a plurality of snap-on buttons receivable by said top.

5. The windshield assembly of claim 4 wherein said windshield attaching means includes an irregular shaped rod like member fixed to each side of said body structure and projecting generally forwardly therefrom where an intermediate front portion thereof is disposed generally below the terminal edge of said lower windshield and adapted to receive said straps therearound for securely stationing the windshield assembly on said vehicle.

* * * * *